United States Patent
Wu

(10) Patent No.: US 12,182,406 B2
(45) Date of Patent: Dec. 31, 2024

(54) PROGRAMMING VIDEO DATA TO DIFFERENT PORTIONS OF MEMORY

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 359 days.

(21) Appl. No.: 17/260,959

(22) PCT Filed: Nov. 26, 2020

(86) PCT No.: PCT/CN2020/131665
§ 371 (c)(1),
(2) Date: Jan. 15, 2021

(87) PCT Pub. No.: WO2022/109898
PCT Pub. Date: Jun. 2, 2022

(65) Prior Publication Data
US 2022/0350494 A1    Nov. 3, 2022

(51) Int. Cl.
*G06F 3/06* (2006.01)

(52) U.S. Cl.
CPC .......... *G06F 3/0611* (2013.01); *G06F 3/0644* (2013.01); *G06F 3/0679* (2013.01)

(58) Field of Classification Search
CPC ..... G06F 3/0644; G06F 3/0679; G06F 3/0611
USPC .......................................................... 711/173
See application file for complete search history.

(56) References Cited

U.S. PATENT DOCUMENTS

| 7,395,423 B1* | 7/2008 | Dondeti ................ H04L 9/0894 |
| | | 713/151 |
| 8,180,995 B2 | 5/2012 | Asnaashari et al. |
| 8,332,578 B2 | 12/2012 | Frickey, III et al. |
| 8,402,243 B2 | 3/2013 | Wakrat et al. |
| 9,570,159 B1* | 2/2017 | Wakchaure ........... G06F 3/0619 |
| 9,589,645 B2 | 3/2017 | Dusija et al. |
| 2006/0056321 A1 | 3/2006 | Kakihara |

(Continued)

FOREIGN PATENT DOCUMENTS

CN           101674444 A      3/2010

OTHER PUBLICATIONS

Lu et al., "Extending the Lifetime of Flash-based Storage through Reducing Write Amplification from File Systems", Jan. 2013, (14 pgs.), Proceedings of the 11th USENIX Conference on File and Storage Technologies.

(Continued)

*Primary Examiner* — Gautam Sain
(74) *Attorney, Agent, or Firm* — Brooks, Cameron & Huebsch, PLLC

(57) ABSTRACT

Programming video data to different portions of memory is described herein. An example system includes a host interface, a memory device having a first portion and a second portion, and a controller coupled to the host interface and the memory device. The controller can be configured to program video data received via the host interface to the first portion of the memory device, and program video data received via the host interface to the second portion of the memory device instead of to the first portion of the memory device in response to receiving a signal that a trigger event has occurred.

17 Claims, 6 Drawing Sheets

(56) References Cited

U.S. PATENT DOCUMENTS

| | | | |
|---|---|---|---|
| 2007/0025151 A1* | 2/2007 | Lee | G11C 11/5621 |
| | | | 365/185.11 |
| 2007/0223875 A1 | 9/2007 | Chung | |
| 2007/0297433 A1 | 12/2007 | Lin | |
| 2009/0282185 A1 | 11/2009 | Van Cauwenbergh | |
| 2010/0169604 A1 | 7/2010 | Trika et al. | |
| 2011/0252180 A1* | 10/2011 | Hendry | G06F 16/1737 |
| | | | 711/3 |
| 2015/0324119 A1* | 11/2015 | Romanovsky | G06F 3/061 |
| | | | 711/103 |
| 2016/0054931 A1 | 2/2016 | Romanovsky et al. | |
| 2016/0291883 A1 | 10/2016 | Manohar et al. | |
| 2017/0068451 A1* | 3/2017 | Kenan | G06F 3/0659 |
| 2019/0044536 A1 | 2/2019 | Khan et al. | |
| 2019/0087284 A1* | 3/2019 | Kim | G06F 11/1441 |
| 2019/0196730 A1 | 6/2019 | Imran | |
| 2019/0287319 A1* | 9/2019 | Golov | G06F 11/0796 |
| 2019/0361625 A1 | 11/2019 | Eliash et al. | |
| 2020/0004671 A1* | 1/2020 | Neufeld | G11C 16/10 |
| 2021/0064280 A1* | 3/2021 | Gunda | G11B 27/005 |

OTHER PUBLICATIONS

International Search Report and Written Opinion from related international application No. PCT/CN2020/131665, dated Aug. 26, 2021, 9 pages.

\* cited by examiner

PROGRAMMING VIDEO DATA TO DIFFERENT PORTIONS OF MEMORY

PRIORITY INFORMATION

This application is a National Stage Application under 35 U.S.C. § 371 of International Application Number PCT/CN2020/131665, filed on Nov. 26, 2020, the contents of which are incorporated herein by reference.

TECHNICAL FIELD

Embodiments of the disclosure relate generally to memory systems and sub-systems, and more specifically, relate to programming video data to different portions of memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
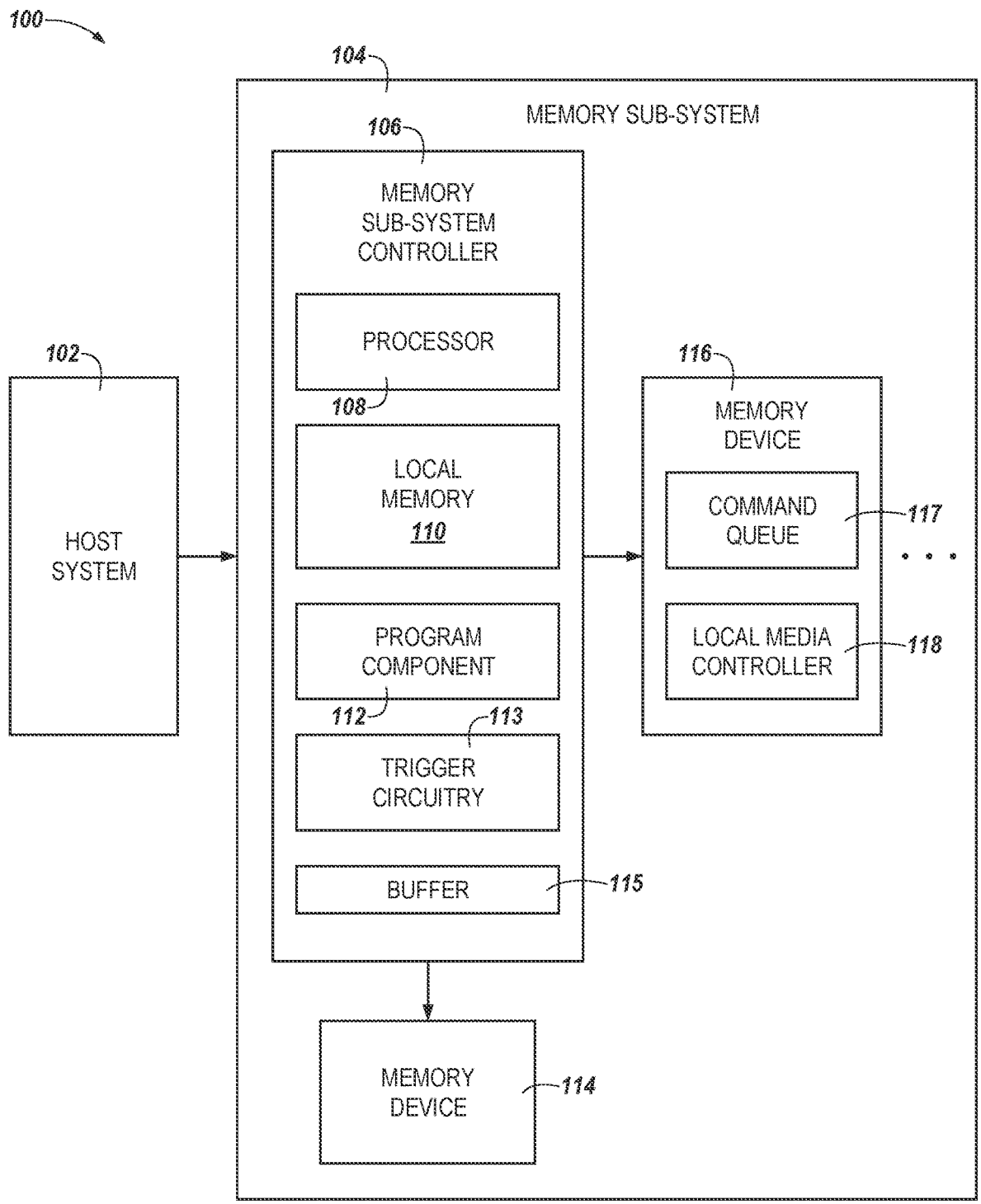
FIG. 1 illustrates an example computing system that includes a memory sub-system in accordance with some embodiments of the present disclosure.

Aspects of the present disclosure are directed to programming video data to different portions of memory. A vehicle can include a memory sub-system, such as a solid state drive (SSD). The memory sub-system can be used for data storage by various components of the vehicle, such as applications that are run by a host system of the vehicle. One example of such an application is an event recorder of the vehicle. The event recorder may also be referred to as a "black box" or "accident data recorder".

A vehicle video recording system for such an application may include a camera, an encoder, and the memory sub-system (e.g., data storage device). The encoder can generate a video stream of video data captured by the camera. The video data may be stored in a buffer (e.g., a DRAM buffer), and continuously programmed (e.g., written) from the buffer to the storage device. However, upon a trigger event (e.g., an accident involving the vehicle) occurring, power to the system may be lost (e.g., cut off), and as such the data being stored in the buffer would need to be programmed to the storage device as soon as possible so that the data is not lost.

In some approaches, the system may include two different (e.g., separate) storage devices, one of which can be used to store normal video data, and another to store the video data triggered by the event. However, utilization of two separate storage devices in such a manner can be costly.

In some approaches, the system may include one storage device to store both the normal video data and the video data triggered by the event, which can be less costly than utilizing two different storage devices. However, storing both the normal video data and the video data triggered by the event together in one device can reduce the write performance of the device. For instance, as a result of wear leveling (e.g., garbage collection) operations that may need to be performed on the device in connection with the normal video data that has previously been programmed to the device, operations to program additional data, such as, for instance, the video data triggered by the event, to the device may be slower (e.g., may write less bits of data per second) than if no data had been previously programmed to the device (e.g., than if the device had not been previously used to store data). This reduced write performance can result in the system not being able to program the video data triggered by the event to the storage device in time before the power is cut off and the data is lost.

Aspects of the present disclosure address this and other deficiencies by utilizing two different portions (e.g., two separate partitions) in one storage device to store the normal video data and the video data triggered by the event (e.g., the normal video data can be stored in one portion, and the video data triggered by the event can be stored in the other portion). Such an approach can achieve the cost savings associated with using a single storage device. Further, reserving one of the portions of the storage device for the video data triggered by the event can ensure that the write performance of the operation to program the video data triggered by the event is sufficient (e.g., fast enough) to program the data to the device before the power is cut off and the data is lost. For instance, even if the other portion of the storage device is being used to store normal video data that has previously been programmed thereto (e.g., the other portion of the storage device is dirty), the condition of that portion of the device will not adversely impact the write performance of the operation to program the video data triggered by the event to the device.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Analogous elements within a Figure may be referenced with a hyphen and extra numeral or letter. Such analogous elements may be generally referenced without the hyphen and extra numeral or letter. For example, elements 544-1, 544-2, . . . , 544-N in FIG. 5 may be collectively referenced as 544. As used herein, the designators "M", "N", "X", and "Y", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 104 in accordance with some embodiments of the present disclosure. The memory sub-system 104 can include media, such as one or more volatile memory devices 114, one or more non-volatile memory devices 116, or a combination thereof. The volatile memory devices 114 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. The host system 102 can be a computing system included in a vehicle. The computing system can run applications that provide component functionality for the vehicle. In some embodiments, the host system 102 is coupled to different types of memory sub-systems 104. FIG. 1 illustrates an example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processing device, the memory resources include memory sub-system 104 for secondary storage and main memory devices (not specifically illustrated) for primary storage, and the network resources include as a network interface (not specifically illustrated). The processing device can be one or more processor chipsets, which can execute a software stack. The processing device can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can run one or more applications. For instance, the applications can run on an operating system (not specifically illustrated) executed by the host system 102. An operating system is system software that manages computer hardware, software resources, and provides common services for the applications. An application is a collection of instructions that can be executed to perform a specific task. By way of example, the application can be a black box application for a vehicle, as described in more detail herein, however embodiments are not so limited.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open not-and (NAND) Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 116 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. For example, the host system 102 can use the memory sub-system 104 to provide storage for a black box application. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 116 include NAND type flash memory. NAND type flash memory includes, for example, two-dimensional NAND (2D NAND) and three-dimensional NAND (3D NAND). The non-volatile memory devices 116 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the memory device used to store data. With some types of memory (e.g., NAND), pages can be grouped to form blocks.

For example, memory device 116 can include a first portion (e.g., first partition) and a second portion (e.g., second partition) separate from the first portion, as will be further described herein. The first portion can include a number of blocks of memory cells that can store more than one bit per cell, and the second portion can include a number of blocks of memory cells that can store one bit per cell. For instance, the first portion can include a number of blocks of MLC, TLC, QLC, and/or PLC memory cells, and the second portion can include a number of blocks of SLC memory cells to increase the performance of the second portion (e.g., increase the speed at which video data can be programmed to the second portion, as will be further described herein). Memory device 116 can be operated to provide storage for a black box application executed by host system 102 for a vehicle, as will be further described herein.

The memory sub-system controller 106 (or controller 106 for simplicity) can communicate with the non-volatile memory devices 116 to perform operations such as reading data, writing data, erasing data, and other such operations at the non-volatile memory devices 116. The memory sub-system controller 106 can include hardware such as one or more integrated circuits and/or discrete components, a buffer memory (e.g., buffer 115), or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processing device 108 (e.g., a processor) configured to execute instructions stored in local memory 110. In the illustrated example, the local memory 110 of the memory sub-system controller 106 is an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory devices 116 and/or the volatile memory devices 114. The memory sub-system controller 106 can be responsible for other operations such as wear leveling operations, error detection and/or correction operations, encryption operations, caching operations, and address translations between a logical address (e.g., logical block address) and a physical address (e.g., physical block address) associated with the non-volatile memory devices 116. The memory sub-system controller 106 can further include host interface circuitry to communicate with the host system 102 via the physical host interface. The host interface circuitry can convert a query received from the host system 102 into a command to access the non-volatile memory devices 116 and/or the volatile memory devices 114 as well as convert responses associated with the non-volatile memory devices 116 and/or the volatile memory devices 114 into information for the host system 102.

In some embodiments, the memory sub-system 104 can be a managed NAND (MNAND) device in which an external controller (e.g., controller 106) is packaged together with one or more NAND die (e.g., the non-volatile memory device 116). In an MNAND device, the external controller 106 can handle high level memory management functions such as media management and the local media controller 118 can manage some of the lower level memory processes such as when to perform programming operations.

As shown in FIG. 1, memory sub-system controller 106 can include a program component 112 that can be configured to perform the examples described herein. In some embodiments, a local media controller 118 of the non-volatile memory device 116 includes at least a portion of the program component 112. For example, the local media controller 118 can include a processor (e.g., processing device) configured to execute instructions stored on the volatile memory devices 114 for performing the operations described herein. In some embodiments, the program component 112 is part of the host system 102, an application, or an operating system. In at least one embodiment, the program component 112 represents data or instructions stored in the memory sub-system 104. The functionality described with respect to the program component 112 can be embodied in machine-readable and executable instructions stored in a tangible machine-readable medium.

For example, the controller 106 (e.g., with the use of the processor 108, instructions stored in the local memory 110, and/or the program component 112), can program video data (e.g., normal video data) received from host system 102 via the host interface to the first portion of memory device 116. For instance, the video data received from host system 102 can be stored in buffer 115, which can be, for instance a DRAM buffer. The data stored in buffer 115 can be continuously programmed to the first portion of memory device 116.

The video data can comprise, for example, data from a camera associated with the vehicle, as will be further described herein. However, embodiments of the present disclosure are not limited to a particular type or source of video data.

Controller 106 can program the video data received from host system 102 (e.g., the video data stored in buffer 115) by, for instance, sending a command to memory device 116. The command can have a first (e.g., low) priority level.

Further, the first portion of memory device 116 can include a first mapping table, as will be further described herein, which can be used to program the video data to the first portion of memory device 116. For example, controller 106 can use the first mapping table to perform wear leveling operations on the blocks of the first portion of memory device 116 to ensure the video data is successfully programmed to the first portion of the memory device. For instance, wear leveling operations performed on the blocks of the first portion of memory device 116 can be used to control the wear rate on those blocks. Wear leveling can increase the life of a non-volatile memory device that can experience failure after a number of program/erase cycles. Wear leveling can include dynamic wear leveling to minimize the amount of valid blocks moved to reclaim a block. Dynamic wear leveling can include a technique called garbage collection in which blocks with a number of invalid pages (e.g., pages with data that has been re-written to a different page and/or is no longer needed on the invalid pages) are reclaimed by erasing the block. Static wear leveling includes writing static data to blocks that have high erase counts to prolong the life of the block.

Program component 112 of controller 106 can receive a signal that a trigger event has occurred. For instance, controller 106 can include trigger circuitry 113. The trigger circuitry 113 can comprise an ASIC that can handle information (e.g., sensor information) received in association with a particular event, such as a determination and/or detection of an accident associated with a vehicle. That is, the trigger event can be an accident associated with the vehicle. Further, the trigger event may involve a power loss to memory sub-system 104 (e.g., a power loss caused by the vehicle accident). By way of example and not by way of limitation, a determination may be made when sensor information is equal to or above a particular threshold value. For example, the threshold value may be a predetermined value programmed at a time of manufacture, or the threshold value may be a value set by programming in a field of use after manufacture. The threshold value may be a value relating to a level of pressure indication from a braking sensor on an autonomous vehicle, a deceleration value received from a sensor, a magnitude and timing abruptness change to a steering sensor, and/or indications relating thereto, etc. The trigger circuitry 113 can provide a trigger event signal and provide the event information (e.g., sensor information) to the processor 108, which in turn can send the signal to program component 112 that a trigger event has occurred.

In response to receiving the signal that the trigger event has occurred, program component 112 can program the video data in buffer 115 to the second portion of memory device 116 instead of to the first portion of memory device 116. This video data programmed to the second portion of memory device 116 can include urgent video data associated with the trigger event.

Program component 112 can program the video data to the second portion of memory device 116 instead of to the first portion by, for example, sending an interrupt command to memory device 116 to stop programming the video data to the first portion of the memory device, along with an additional command to program the video data to the second portion of the memory device. Memory device 116 (e.g., controller 118) can stop the programming of the video data to the first portion, and instead program the video data to the second portion, in response to receiving these respective commands.

As an additional example, program component 112 can program the video data to the second portion of memory device 116 instead of to the first portion without sending an interrupt command to memory device 116 (e.g., memory device 116 can automatically stop programming the video data to the first portion of memory device 116 once video data is being programmed to the second portion). For instance, program component 112 can send a command to memory device 116 to program the video data to the second portion of the memory device. The command can have a second (e.g., urgent) priority level that is a higher priority level than the first priority level of the command previously sent by program component 112 to program the video data to the first portion of the memory device. Memory device 116 (e.g., controller 118) can stop the programming of the video data to the first portion, and instead program the video data to the second portion, in response to the higher priority level of this command. For instance, memory device 112 can include a command queue 117 for commands received from controller 106 that are to be executed by memory device 116, and in response to receiving the command with the higher priority level (e.g., in response to the higher priority level of the command), memory device 116 can move that command ahead of any other command(s) already in the command queue 117, including the previous, lower priority level command to program the video data to the first portion of the memory device. Accordingly, whenever a high priority command to program the video data to the second portion enters the queue, it will be executed by memory device 116 as soon as possible, resulting in the other commands in the queue (e.g., the lower priority level command to program the video data to the second portion of the memory device) being stalled.

Further, the second portion of memory device 116 can include a second mapping table, as will be further described herein, which can be used to program the video data to the second portion of memory device 116. For example, controller 106 can use the second mapping table to perform wear leveling operations on the blocks of the second portion of memory device 116 to ensure the video data is successfully programmed to the second portion of the memory device. Because this second mapping table is separate from the first mapping table included in the first portion of memory device 116, the wear leveling operations performed on the second portion of memory device 116 can be separate from the wear leveling operations performed on the first portion of memory device 116. Accordingly, the condition of the first portion of memory device 116 (e.g., being used to store the normal, pre-trigger event video data) will not adversely impact the performance (e.g., speed) of the programming of the video data (e.g., the urgent video data associated with the trigger event) to the second portion of memory device 116.

Further, the second portion of memory device 116 can have no data stored therein (e.g., may be empty and/or have never had data written thereto) prior to the video data being programmed thereto in response to the trigger event. For instance, the second portion of memory device 116 can be erased during initialization (e.g., booting up) of memory device 116. This can further increase the performance (e.g., speed) of the programming of the video data to the second portion of memory device 116.

The memory sub-system 104 can also include additional circuitry or components that are not illustrated. In some embodiments, the memory sub-system 104 can include and address circuitry (e.g., a row decoder and a column decoder) that can receive an address from the memory sub-system controller 114 and decode the address to access the non-volatile memory devices 116.

Figure 2:
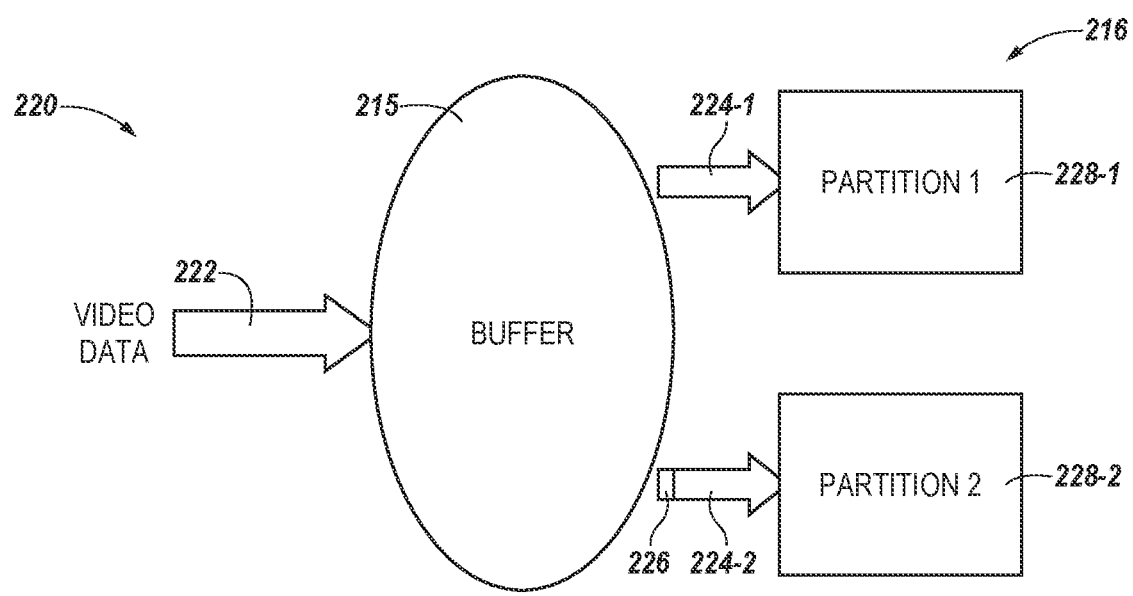
FIG. 2 is a flow diagram of video data being programmed to a non-volatile memory device in accordance with some embodiments of the present disclosure.

FIG. 2 is a flow diagram 220 of video data 222 being programmed to a non-volatile memory device 216 in accordance with some embodiments of the present disclosure. Memory device 216 can include a first portion 228-1 (e.g., partition 1) and a second portion 228-2 (e.g., partition 2) separate from the first portion. Portion 228-1 can include a number of blocks of memory cells that can store more than one bit per cell, and portion 228-2 can include a number of blocks of memory cells that can store one bit per cell. For instance, portion 228-1 can include a number of blocks of MLC, TLC, QLC, and/or PLC memory cells, and portion 228-2 can include a number of blocks of SLC memory cells to increase the performance of portion 228-2 (e.g., increase the speed at which video data 222 can be programmed to portion 228-2). Further, portion 228-2 can have no data stored therein (e.g., may be erased) prior to any video data 222 being programmed thereto, as previously described herein, which can further increase the performance of portion 228-2.

Video data 222 can be received from a host system. For example, the host system can be a computing system on a vehicle that receives video data from one or more cameras, generates (e.g. using an encoder) a video stream of the video data captured by the cameras, stores the video data (e.g., in association with a black box application for the vehicle). The black box for a vehicle may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. The video data 222 yields a considerable quantity of data per unit time for sequential write throughput from a host system. Upon an event, a quantity (e.g., thirty (30) seconds) of playback time immediately preceding an event may need to be captured to determine the cause of an incident. A playback may be referred to as a "snapshot". The application that controls storage of such information is referred to herein as a black box. A black box is one such application in where the user capacity requirement could be as low as one hundred and twenty-eight (128) GB, but the total bytes written (TBW) requirement could be as high as hundreds of Peta Bytes. The examples of values given are not limiting but highlight the relative difference between the requirements for capacity and TBW. A black box may need to store at least a few, most recent snapshots.

Video data 222 can be stored in buffer 215, which can be, for instance, a DRAM buffer. During normal operation of the host system, the video data 222 can be continuously programmed 224-1 from buffer 215 to the first portion 228-1 of memory device 216. However, upon a trigger event 226 in the host system (e.g., an accident involving the vehicle) occurring, power to the system may be lost (e.g., cut off), and the video data currently being stored in the buffer would need to be programmed (e.g., flushed) to memory device 216 as soon as possible so that the data (e.g., the urgent data associated with the trigger event) is not lost. Accordingly, upon trigger event 226 occurring, video data 222 can be programmed 224-2 to the high performance second portion 228-2 of memory device 216, instead of to the first portion 228-1, to ensure that the data is not lost. The video data 222 can be programmed 224-2 to the second portion 228-2 instead of to the first portion 228-1, for example, sending an interrupt command to memory device 216 to stop programming the video data 222 to the first portion 228-1, as previously described herein. As an additional example, memory device 216 can automatically stop programming the video data to the first portion 228-1 once video data is being programmed 224-2 to the second portion 228-2, as previously described herein.

Figure 3:
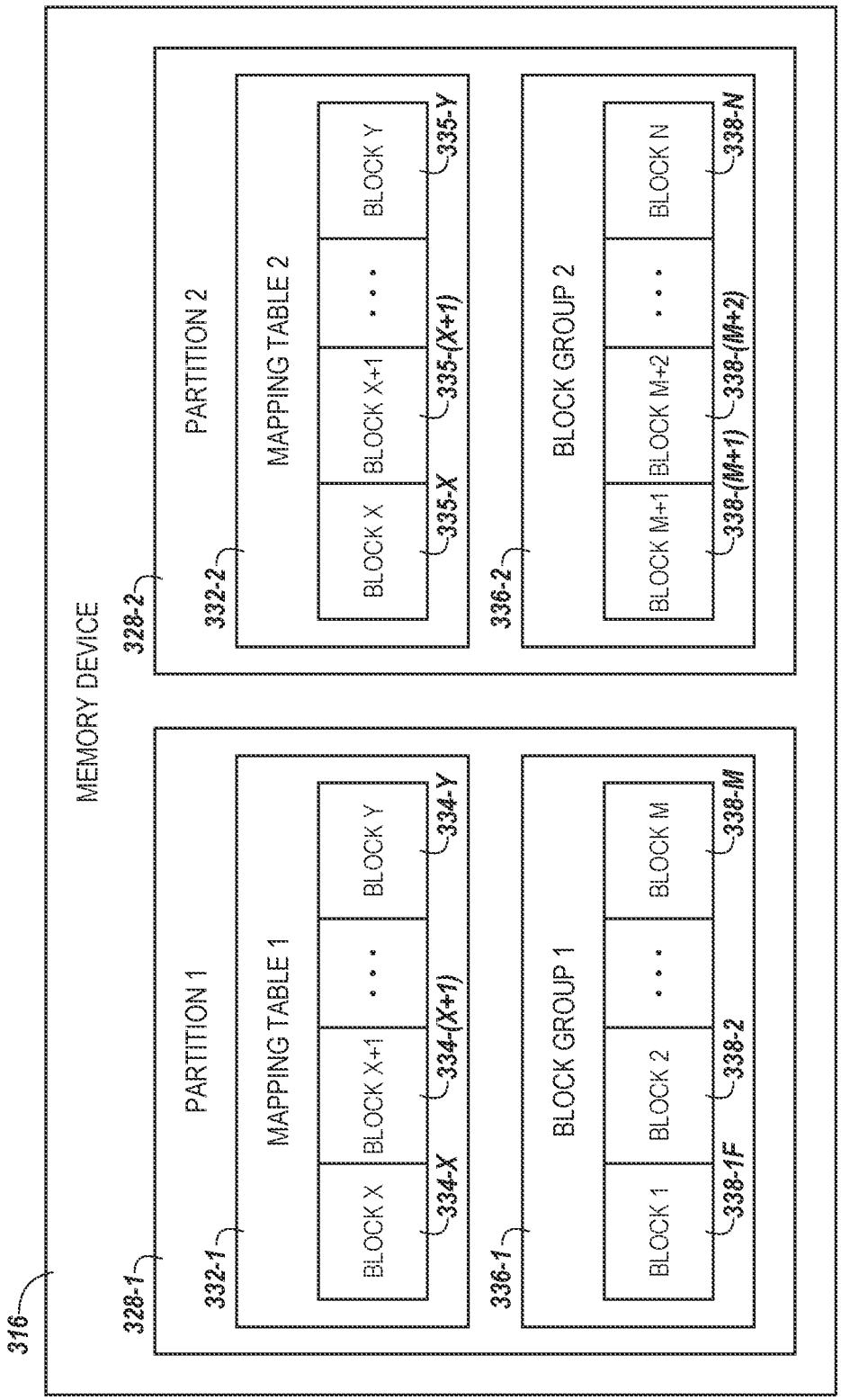
FIG. 3 illustrates an example non-volatile memory device in accordance with some embodiments of the present disclosure.

FIG. 3 illustrates an example non-volatile memory device 316 in accordance with some embodiments of the present disclosure. Memory device 316 can include a first portion 328-1 (e.g., partition 1) and a second portion 328-2 (e.g., partition 2) separate from the first portion.

Portion 328-1 can include a number of blocks of memory cells that can store more than one bit per cell. For example, portion 328-1 can include a group 336-1 of blocks (e.g., block group 1) that includes blocks 338-1, 338-2, ..., 338-M (e.g., block 1, block 2, ..., block M) of memory cells, and a mapping table 332-1 (e.g., mapping table 1) that includes blocks 334-X, 334-X+1, ..., 334-Y (e.g., block X, block X+1, ..., block Y) of memory cells. Block group 336-1 (e.g., blocks 338-1, 338-2, ..., 338-M) can be used to store normal video data, as previously described herein. Mapping table 332-1 (e.g., blocks 334-X, 334-X+1, ..., 334-Y) can be used to perform wear leveling operations on block group 336-1 to ensure the normal video data is successfully programmed to block group 336-1, as previously described herein.

Portion 328-2 can have increased performance (e.g., increased write performance) as compared to portion 328-1. For example, portion 328-2 can include a number of blocks of memory cells that can store one (e.g., a single) bit per cell. For instance, portion 328-2 can include a group 336-2 of blocks (e.g., block group 2) that includes blocks 338-M+1, 338-M+2, ..., 338-N (e.g., block M+1, block M+2, ..., block N) of memory cells, and a mapping table 332-2 (e.g., mapping table 2) that includes blocks 335-X, 335-X+1, ..., 335-Y (e.g., block X, block X+1, ..., block Y) of memory cells. Block group 336-2 (e.g., blocks 338-M+1, 338-M+2, ..., 338-N) can be used to store urgent video data associated with a trigger event, as previously described herein. Mapping table 332-2 (e.g., blocks 335-X, 335-X+1, ..., 335-Y) can be used to perform wear leveling operations on block group 336-2 to ensure the urgent video data is successfully programmed to block group 336-2, as previously described herein.

Because portion 328-1 (e.g., mapping table 332-1 and block group 336-1) are separate from portion 328-2 (e.g., mapping table 332-2 and block group 336-2), the wear leveling operations performed on block group 336-1 can be separate from the wear leveling operations performed on block group 336-2. Accordingly, the condition of portion 328-1 (e.g., block group 336-1) may not adversely impact the performance (e.g., write performance) of portion 328-2 (e.g., block group 336-2). For instance, the performance of portion 328-2 may remain high even when portion 328-1 is being used to store the normal video data (e.g., is dirty).

Figure 4:
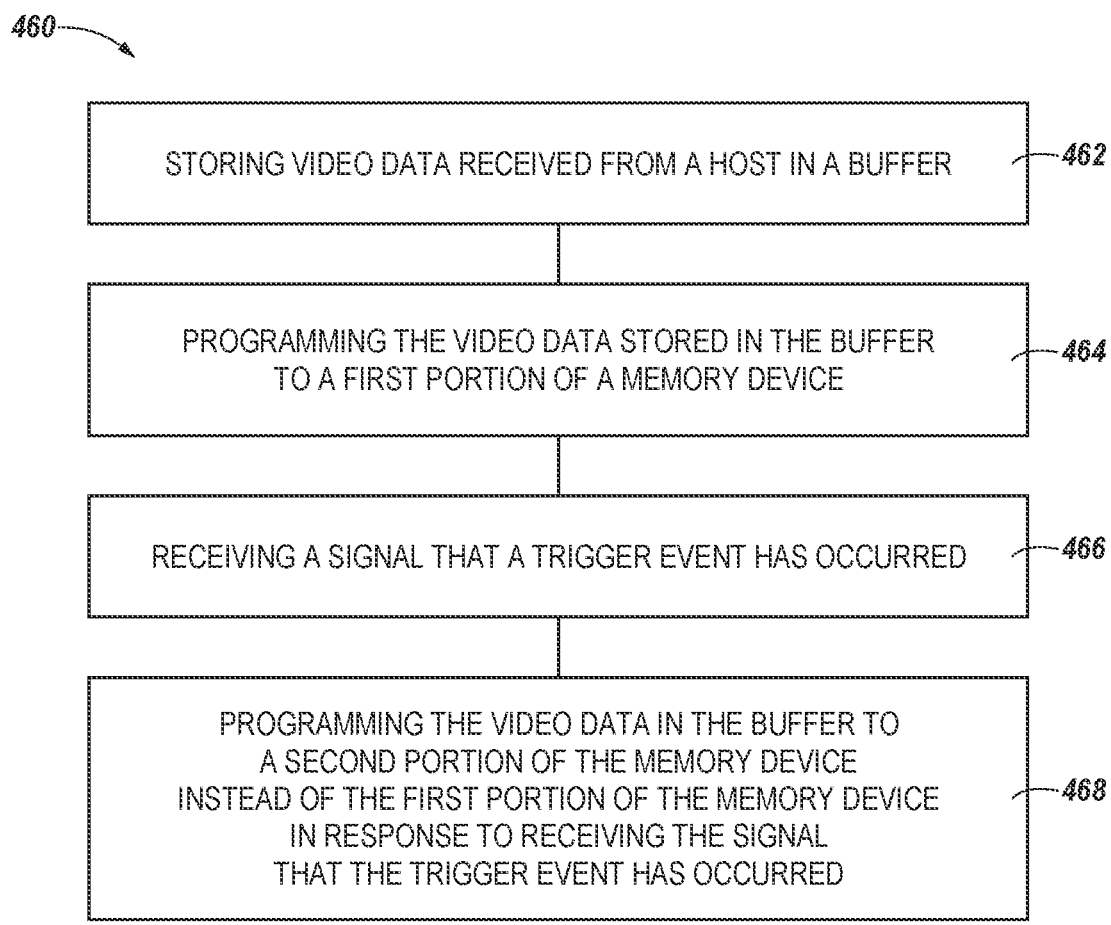
FIG. 4 is a flow diagram of an example method for operating a memory sub-system accordance with some embodiments of the present disclosure.

FIG. 4 is a flow diagram of an example method 460 for operating a memory sub-system accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, program component 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 462 in the example method of FIG. 4, video data received from a host is stored in a buffer. The host and buffer can be, for instance, host system 102 and buffer 115, respectively, previously described in connection with FIG. 1, and the video data can be, for instance, video data 222 previously described in connection with FIG. 2.

At block 464 in the example method of FIG. 4, the video data stored in the buffer is programmed to a first portion of a memory device. The memory device can be, for instance, memory device 116 previously described in connection with FIG. 1, and the first portion can be, for instance, portion 228-1 previously described in connection with FIG. 2. The video data can be programmed to the first portion of the memory device by, for example, sending a command to the memory device and using a mapping table included in the first portion of the memory device, as previously described herein.

At block 466 in the example method of FIG. 4, a signal that a trigger event has occurred is received. The trigger event can be, for instance, an accident associated with a vehicle, as previously described herein. The signal can be received from, for instance, trigger circuitry 113 previously described in connection with FIG. 1.

Figure 5:
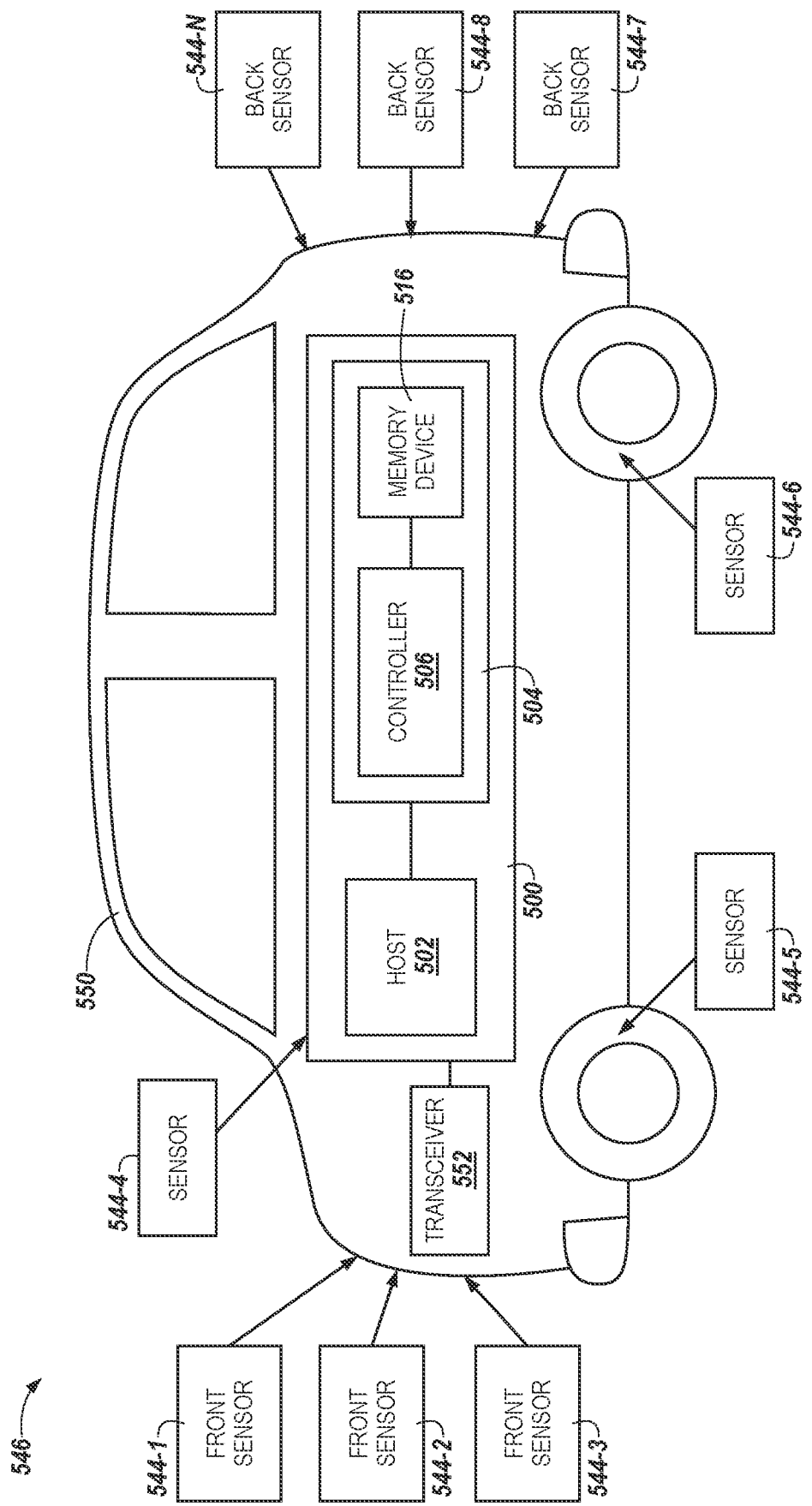
FIG. 5 illustrates an example of a system including a computing system in a vehicle in accordance with some embodiments of the present disclosure.

At block 468 in the example method of FIG. 5, the video data in the buffer is programmed to a second portion of the memory device instead of to the first portion of the memory device in response to receiving the signal that the trigger event has occurred. The second portion of the memory device can be, for instance, portion 228-2 previously described in connection with FIG. 2. The video data can be programmed to the second portion of the memory device instead of the first portion by, for example, sending an interrupt command to the memory device to stop programming the video data to the first portion, as previously described herein, or the memory device can automatically stop programming the video data to the first portion once the video data is being programmed to the second portion, as previously described herein.

FIG. 5 illustrates an example of a system 546 including a computing system 500 in a vehicle in accordance with some embodiments of the present disclosure. The computing system 500 can include a memory sub-system 504, which is illustrated as including a controller 506 and non-volatile memory device 516 for simplicity but is analogous to the memory sub-system 104 illustrated in FIG. 1. The computing system 500, and thus the host 502, can be coupled to a number of sensors 544 either directly, as illustrated for the sensor 544-4 or via a transceiver 552 as illustrated for the sensors 544-1, 544-2, 544-3, 544-5, 544-6, 544-7, 544-8, . . . , 544-N. The transceiver 552 is able to receive data from the sensors 544 wirelessly, such as by radio frequency communication. In at least one embodiment, each of the sensors 544 can communicate with the computing system 500 wirelessly via the transceiver 552. In at least one embodiment, each of the sensors 544 is connected directly to the computing system 500 (e.g., via wires or optical cables).

The vehicle 550 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 544 are illustrated in FIG. 5 as including example attributes. For example, sensors 544-1, 544-2, and 544-3 are cameras collecting data from the front of the vehicle 550. Sensors 544-4, 544-5, and 544-6 are microphone sensors collecting data from the from the front, middle, and back of the vehicle 550. The sensors 544-7, 544-8, and 544-N are cameras collecting data from the back of the vehicle 550. As another example, the sensors 544-5, 544-6 are tire pressure sensors. As another example, the sensor 544-4 is a navigation sensor, such as a global positioning system (GPS) receiver. As another example, the sensor 544-6 is a speedometer. As another example, the sensor 544-4 represents a number of engine sensors such as a temperature sensor, a pressure sensor, a voltmeter, an ammeter, a tachometer, a fuel gauge, etc. As another example, the sensor 544-4 represents a camera. Video data can be received from any of the sensors 544 associated with the vehicle 550 comprising cameras. In at least one embodiment, the video data can be compressed by the host 502 before providing the video data to the memory sub-system 504.

The host 502 can execute instructions to provide an overall control system and/or operating system for the vehicle 550. The host 502 can be a controller designed to assist in automation endeavors of the vehicle 550. For example, the host 502 can be an advanced driver assistance system controller (ADAS). An ADAS can monitor data to prevent accidents and provide warning of potentially unsafe situations. For example, the ADAS can monitor sensors in the vehicle 550 and take control of vehicle 550 operations to avoid accident or injury (e.g., to avoid accidents in the case of an incapacitated user of a vehicle). The host 502 may need to act and make decisions quickly to avoid accidents. The memory sub-system 504 can store reference data in the non-volatile memory device 516 such that data from the sensors 544 can be compared to the reference data by the host 502 in order to make quick decisions.

Figure 6:
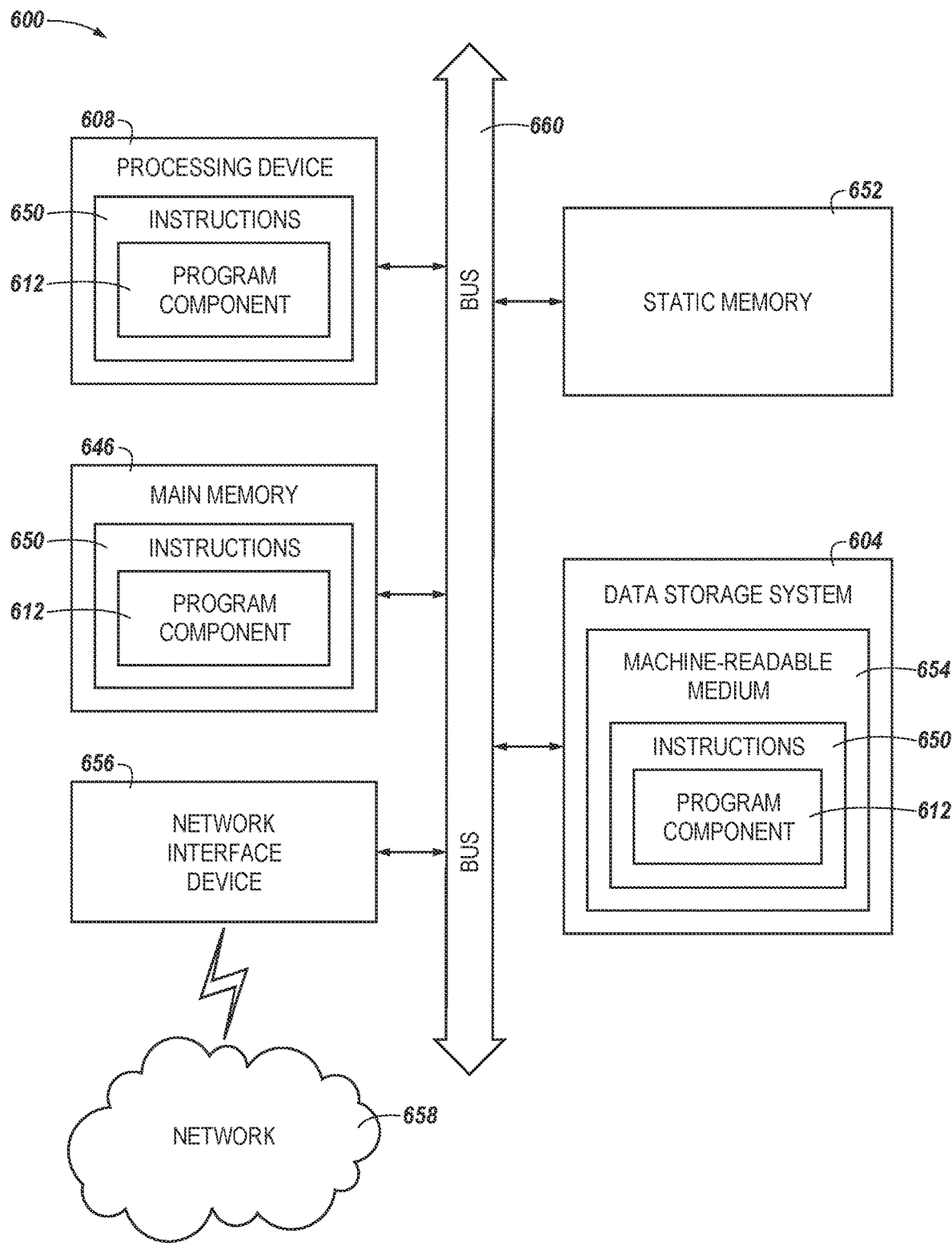
FIG. 6 is a block diagram of an example computer system in which embodiments of the present disclosure may operate.

FIG. 6 is a block diagram of an example computer system in which embodiments of the present disclosure may operate. Within the computing system 600, a set of instructions, for causing a machine to perform one or more of the methodologies discussed herein, can be executed. The computing system 600 includes a processing device 608, a main memory 646, a static memory 652 (e.g., flash memory, static random access memory (SRAM), etc.), and a data storage system 604, which communicate with each other via a bus 660. The data storage system 604 is analogous to the memory sub-system 104 illustrated in FIG. 1.

The processing device 608 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 608 can also be one or more special-purpose processing devices such as an ASIC, an FPGA, a digital signal processor (DSP), network processor, or the like. The processing device 608 is configured to execute instructions 650 for performing the operations and steps discussed herein. The computing system 600 can further include a network interface device 656 to communicate over a network 658.

The data storage system 604 can include a machine-readable storage medium 654 (also known as a computer-readable medium) on which is stored one or more sets of instructions 650 or software embodying one or more of the methodologies or functions described herein. The instructions 650 can also reside, completely or at least partially, within the main memory 646 and/or within the processing device 608 during execution thereof by the computing system 600, the main memory 646 and the processing device 608 also constituting machine-readable storage media.

In one embodiment, the instructions 650 include instructions to implement functionality corresponding to the program component 112 of FIG. 1. For instance, the instructions can include program component 612 instructions to program video data to a first portion of a memory device, and program video data to a second portion of the memory device instead of the first portion in response to receiving a signal that a trigger event has occurred, as previously described herein. While the machine-readable storage medium 654 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a host interface;
a memory device having a first portion and a second portion, wherein the first portion is separate from the second portion, and wherein the first portion has a first mapping table and the second portion has a second mapping table that is separate from the first mapping table, such that a condition of the first portion does not affect performance of the second portion; and
a controller coupled to the host interface and the memory device, wherein the controller is configured to:
continuously program video data received via the host interface to the first portion of the memory device using the first mapping table;
program, using the second mapping table, video data received via the host interface to the second portion of the memory device instead of to the first portion of the memory device, and stop the programming of the video data to the first portion of the memory device, in response to receiving a signal that a trigger event has occurred, such that the video data is not lost upon the occurrence of the trigger event, wherein the signal is a trigger event signal received by the controller;
perform wear leveling operations on the first portion of the memory device using the first mapping table; and
perform wear leveling operations on the second portion of the memory device using the second mapping table such that the wear leveling operations performed on the first portion of the memory device are separate from the wear leveling operations performed on the second portion of the memory device.

2. The system of claim 1, wherein the system further includes a buffer configured to store the video data received via the host interface before the video data is programmed.

3. The system of claim 1, wherein the trigger event comprises a power loss to the system.

4. The system of claim 1, wherein:
the first portion of the memory device comprises a number of blocks of memory cells configured to store more than one bit per memory cell; and
the second portion of the memory device comprises a number of blocks of single level memory cells configured to store one bit per memory cell.

5. A method, comprising:
storing video data received from a host in a buffer;
continuously programming the video data stored in the buffer to a first portion of a memory device using a first mapping table included in the first portion of the memory device;
receiving a signal that a trigger event has occurred at a controller, wherein the signal is a trigger event signal;
programming, using a second mapping table included in a second portion of the memory device that is separate from the first portion of the memory device, the video data in the buffer to the second portion of the memory device instead of to the first portion of the memory device, and stopping the programming of the video data to the first portion of the memory device, in response to receiving the signal that the trigger event has occurred, such that the video data is not lost upon the occurrence of the trigger event, wherein the second mapping table is separate from the first mapping table, such that a condition of the first portion does not affect performance of the second portion;
performing wear leveling operations on the first portion of the memory device using the first mapping table; and
performing wear leveling operations on the second portion of the memory device using the second mapping table such that the wear leveling operations performed on the first portion of the memory device are separate from the wear leveling operations performed on the second portion of the memory device.

6. The method of claim 5, wherein the method includes erasing the second portion of the memory device during initialization of the memory device.

7. The method of claim 5, wherein programming the video data in the buffer to the second portion of the memory device instead of the first portion of the memory device includes:
sending a command to the memory device to stop programming the video data in the buffer to the first portion of the memory device in response to receiving the signal that the trigger event has occurred; and
stopping, by the memory device, the programming of the video data in the buffer to the first portion of the memory device in response to receiving the command.

8. The method of claim 5, wherein programming the video data in the buffer to the second portion of the memory device instead of the first portion of the memory device includes:
sending a command to the memory device to program the video data in the buffer to the second portion of the memory device in response to receiving the signal that the trigger event has occurred; and
stopping, by the memory device, the programming of the video data in the buffer to the first portion of the memory device in response to a priority level of the command.

9. The method of claim 8, wherein:
the memory device includes a command queue; and
the method includes stopping the programming of the video data in the buffer to the first portion of the memory device by moving, in response to the priority level of the command, the command ahead of another command in the command queue to program the video data in the buffer to the first portion of the memory device.

10. The method of claim 5, wherein the buffer is a dynamic random access memory (DRAM) buffer.

11. The method of claim 5, wherein the video data programmed to the second portion of the memory device comprises video data associated with the trigger event.

12. The method of claim 5, wherein the method includes operating the memory device to provide storage for a black box application executed by the host for a vehicle.

13. A non-transitory machine readable medium storing instructions executable to:
continuously program video data received from a host to a first portion of a memory device using a first mapping table included in the first portion of the memory device;
program video data received from the host to a second portion of the memory device that is separate from the first portion of the memory device instead of to the first portion of the memory device, and stop the programming of the video data to the first portion of the memory device, in response to receiving a signal that a trigger event has occurred, such that the video data is not lost upon the occurrence of the trigger event, wherein the signal is a trigger event signal, and wherein the video data is programmed to the second portion of the memory device using a second mapping table included in the second portion of the memory device that is separate from the first mapping table, such that a condition of the first portion of the memory device does not affect performance of the second portion of the memory device;
perform wear leveling operations on the first portion of the memory device using the first mapping table; and
perform wear leveling operations on the second portion of the memory device using the second mapping table such that the wear leveling operations performed on the first portion of the memory device are separate from the wear leveling operations performed on the second portion of the memory device.

14. The medium of claim 13, wherein the second portion of the memory device has no data stored therein prior to the video data being programmed thereto.

15. The medium of claim 13, wherein the instructions are executable to:
program the video data received from the host to the first portion of the memory device by sending a first command having a first priority level to the memory device; and
program the video data received from the host to the first portion of the memory device by sending a second command having a second priority level to the memory device, wherein the second priority level is a higher priority level than the first priority level.

16. The medium of claim 13, wherein the video data received from the host comprises data from a camera associated with a vehicle.

17. The medium of claim 13, wherein the trigger event comprises a vehicle accident.

* * * * *